Patented July 15, 1924.

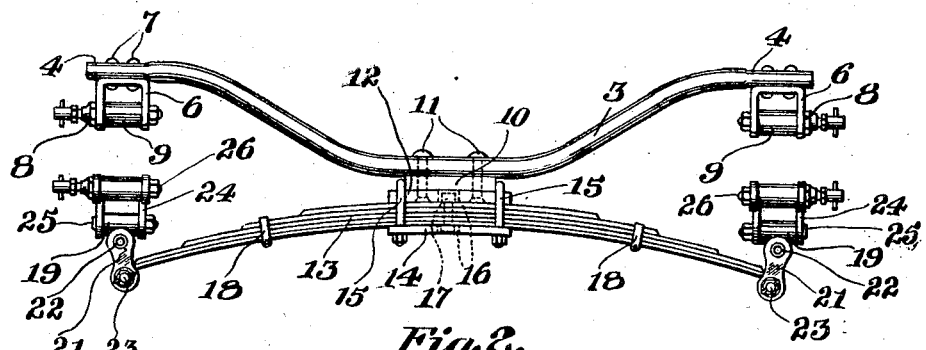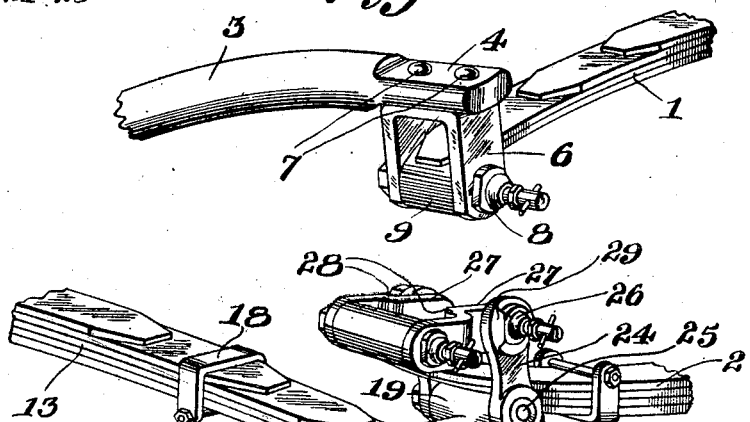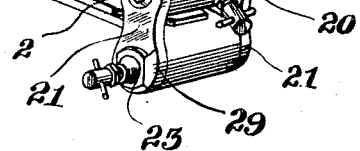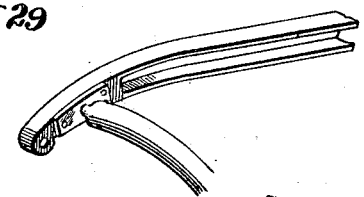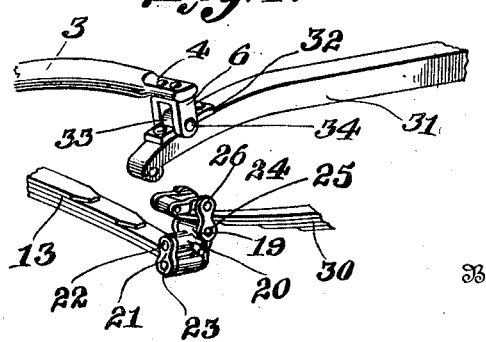

1,501,475

UNITED STATES PATENT OFFICE.

WILLIAM B. CONNELL, OF DALLAS, TEXAS.

AUTOMOBILE SPRING SUSPENSION.

Application filed January 6, 1923. Serial No. 611,105.

*To all whom it may concern:*

Be it known that I, WILLIAM B. CONNELL, a citizen of the United States, residing at Dallas, in the county of Dallas and State of Texas, have invented certain new and useful Improvements in Automobile Spring Suspensions; and I do hereby declare the following to be a full, clear, and exact description of the invention, such as will enable others skilled in the art to which it appertains to make and use the same.

This invention relates to improvements in automobile spring suspensions, and more particularly to the suspension of the rear end of said automobile.

An object of my invention is to provide a suitable rear spring suspension for automobiles comprising a transverse rod connected at its outer ends with the upper portions of the longitudinally extending full elliptic springs, and a transverse semi-elliptic spring connected to said transverse rod, and having the ends of said transverse spring connected to the ends of the lower portions of the longitudinally extending full elliptic springs.

A further object of my invention is to provide an automobile or vehicle with an attachment which comprises a semi-elliptic spring positioned transversely across the rear end of an automobile and combined with a double shackle connecting said transverse spring with the rear ends of the usual longitudinally extending springs.

A further object of my invention is to provide an automobile or vehicle with a double shackle and also a compound link so positioned and adjusted to the spring suspension of the rear end of an automobile or vehicle as to assure the operation of the transverse spring and the transverse rod in vertical planes.

A further object of my invention is to provide an automobile or vehicle with a transverse bar attachment for a transverse spring, adjusted to the rear end of an automobile or vehicle, connecting with the projecting side frame members and so positioned and adjusted by inserting a block on inside of each side frame member to receive the ends of the transverse rod, and also by superimposing a block on each side frame member to receive the ends of the transverse rod, so as to assure the operation of the transverse spring and the transverse rod in vertical planes.

Further objects of my invention will be apparent as the description proceeds.

The accompanying drawings constitute a part of this specification.

Figure 1 is a rear elevation of my improved spring suspension;

Figure 2 is a perspective view of the bar connected with the rear end of the upper portion of the longitudinally side spring;

Figure 3 is a perspective view of a double or combined shackle connection between the transverse semi-elliptic spring and the lower portion of the longitudinally extending side springs; and Figure 4 is a modification of the spring suspension showing it attached where a half elliptic rear spring is used in place of a full elliptic spring.

Fig. 5 is a modification of the frame structure shown in Fig. 4.

Like characters of reference are used throughout the following description to designate corresponding parts.

The springs 1 and 2 are customarily connected together at their free ends by means of spring shackles and pintles, but are now separated, and are held apart from each other by means now described.

A rod 3, preferably slightly curved or substantially U-shaped, is provided at its outer ends with the flattened surfaces 4 to which are connected the inverted U-clips 6, which in turn are held in position by the rivets 7. Pintles 8 extend through the end bearings 9 of the spring 1, and suspend the same to the U-clips 6.

Midway of the rod 3 is a block 10, which is held in position on the lower side of said rod by means of the bolts or rivets 11. The lower face or surface of the block 10 is slightly curved to conform with the surface of the curved block 12 which extends beyond the ends of said block 10 and in contact therewith. This block 12 is also held in position by means of the rivets 11, which have their lower heads countersunk in the undersurface thereof. A transverse semi-elliptic leaf spring 13 is held in position at its central point against the under surface of the block 12, by means of the lower curved block 14, which is drawn up against the spring by means of the U-bolts 15, which extend up adjacent the sides of the spring 13, and through holes or openings in the block 14. Centrally disposed openings 16 are formed in the blocks 12 and 14 and are adapted to loosely receive the bolt 17, which holds the leaves of the spring 13 firmly together. The usual spring clips 18 are positioned over the spring 13 between the center point and the ends thereof.

A compound or double shackle is formed with integrally connected barrels 19 and 20, which are positioned one above the other and at right angles to each other. Side links 21 are pivotally connected to the barrel 20, by means of the pintle 22. The free ends of the spring 13 are supported between the free ends of the links 21 by means of the pintles 23.

The barrel 19 has links 24 pivoted at their inner ends on the pintle 25, the free ends of which are connected by the pintles 26. Rearwardly extending links 27, which are offset as at 28, are connected at their inner ends to the pintle 26, and at their outer ends to the end bearing of the spring 1. It will be seen that the offset portions 28 of the links 27 rest on the upper surface of the said spring 2.

All of the links are provided with outwardly extending lugs or ears 29, which cooperate with the pintles, which in turn have heads provided with flattened surfaces which contact the ears 29, thereby preventing the accidental uncoupling of the several parts. Oiling connections are provided for all joints where friction may occur.

On Figure 4 of the drawings, I have illustrated a modification, where a half elliptic spring 30 is used and where the connections for its ends are the same as for the springs 2. Here the spring 30 is separated from the end of the chassis or frame 31, and a plate 32 having a cross eye bearing 33 formed integral thereon is attached to the upper surface of the said chassis. The inverted U-clips 6 are then attached to the eye-bearing 33 by means of the pintle 34. Thus, it will be seen that the same suspension may be used on automobiles having different types of spring suspensions, and that all of the mechanism is out from the body of the automobile where easy access may be had to the same. It will further be understood that this construction will be used on both sides of the automobile. Many minor changes in detail of description may be resorted to without departure from the spirit of the invention.

I claim:

1. In a vehicle, the combination with the usual longitudinally extending side springs and the transverse semi-elliptic spring, of a universal shackle between said springs, one end of said transverse spring being connected with the lower end of said shackle, and a pair of links connected to the rear terminal of the longitudinally extending spring and extending forwardly thereof, said links at their forward ends being connected to the upper end of said shackle.

2. The combination as set forth in claim 1, said longitudinal spring extending over said shackle and having bearing thereon, at a point removed from its terminal.

In testimony whereof I affix my signature.

WILLIAM B. CONNELL.